United States Patent [19]

Katoh et al.

[11] Patent Number: 4,818,581
[45] Date of Patent: Apr. 4, 1989

[54] BIAXIALLY ORIENTED POLYESTER FILM

[75] Inventors: Hideo Katoh, Kanagawa; Hisashi Hamano, Sagamihara; Kinji Hasegawa, Yokohama; Yoshihiro Noumi, Sagamihara, all of Japan

[73] Assignee: Teijin Limited, Osaka, Japan

[21] Appl. No.: 89,571

[22] Filed: Aug. 26, 1987

[30] Foreign Application Priority Data

| Aug. 27, 1986 | [JP] | Japan | 61-199150 |
| Sep. 1, 1986 | [JP] | Japan | 61-203836 |
| Mar. 10, 1987 | [JP] | Japan | 62-53095 |
| Mar. 23, 1987 | [JP] | Japan | 62-65797 |
| Mar. 25, 1987 | [JP] | Japan | 62-69142 |

[51] Int. Cl.$^4$ .............................................. B32B 27/00
[52] U.S. Cl. ................................. 428/143; 428/480; 428/694; 428/900; 428/402
[58] Field of Search ............... 428/480, 143, 694, 900

[56] References Cited

U.S. PATENT DOCUMENTS

| 4,595,715 | 6/1986 | Kuze | 428/480 |
| 4,677,188 | 6/1987 | Utsumi et al. | 428/480 |
| 4,680,217 | 7/1987 | Kanesaki et al. | 428/480 |
| 4,720,411 | 1/1988 | Shimozawa et al. | 428/141 |
| 4,720,412 | 1/1988 | Katoh et al. | 428/141 |
| 4,725,472 | 2/1988 | Okabe et al. | 428/480 |
| 4,726,998 | 2/1988 | Ikenaga et al. | 428/900 |

*Primary Examiner*—Edith Buffalow
*Attorney, Agent, or Firm*—Wenderoth, Lind & Ponack

[57] ABSTRACT

A biaxially oriented polyester film formed from an intimate mixture comprising (1) an aromatic polyester, and (2) 0.01 to 4% by weight, based on the aromatic polyester, of spherical fine particles of silica having (a) an average particle diameter of 0.05 to 4 μm, (b) a particle diameter ratio, defined by the ratio of maximum diameter of minimum diameter, of from 1.0 to 1.2, and (c) a relative standard deviation (σ) of particle size, of up to 0.5. A biaxially oriented polyester film formed from an intimate mixture comprising (1) an aromatic polyester, (2) 0.005 to 3% by weight, based on the aromatic polyester, of spherical fine particles of silica having the same properties as the above-mentioned (a), (b) and (c), and (3) 0.005 to 3% by weight, based on the aromatic polyester, of inert fine particles having an average particle diameter of 0.01 to 3 μm and not exceeding the average particle diameter of the spherical fine particles of silica. The biaxially oriented films are useful for a magnetic recording medium.

13 Claims, No Drawings

BIAXIALLY ORIENTED POLYESTER FILM

This invention relates to a biaxially oriented polyesater film. More specifically, it relates to a biaxially oriented polyester film containing substantially spherical fine particles of silica having a very sharp particle size distribution.

Polyester films typified by a polyethylene terephthalate film are used in a wide range of applications such as magnetic tapes, capacitors, photography, packaging and overhead projectors because of their excellent physical and chemical properties.

The slipperiness and abrasion resistance of polyester films are two great factors which affect not only workability in film production and processing steps in various uses but also product quality. If a polyester film has insufficient slipperiness or abrasion resistance, various troubles occur. For example, when a polyester film is to be used as a magnetic tape by coating a magnetic layer on its surface, friction between the film surface and a coating roll is great during the coating of the magnetic layer. The film surface is heavily worn by the friction, and in an extreme case, creases, scratches, etc. occur on the film surface. An audio or video tape or a computer tape obtained by slitting the film coated with the magnetic layer also markedly undergoes friction with many guide portions, reproduction heads, etc. in unwinding or winding from and on reels or cassettes and in other operations, and scratches and distortions will occur. Furthermore, a white powdery substance is deposited as a result of abrasion of the film surface. Frequently, these troubles become a great cause of dropout, which is dropping of recorded magnetic signals.

Generally, the slipperiness of a film is improved by imparting protrusions and depressions to the film surface and thereby reducing the area of contact between the film surface and guide rollers or the like. Roughly, this is achieved by (i) a method in which inert fine particles are deposited from the catalyst residue during production of polymer used as a raw material for film foundation, and (ii) a method in which inert inorganic fine particles are added to the starting polymer. Generally, with larger particle sizes, the fine particles in the starting polymer have a greater slipperiness improving effect. However, in precision applications as in magnetic tapes, particularly video magnetic tapes, the large particle size of the fine particles itself might cause occurrence of dropout, and to prevent dropout, the protrusions and depressions on the film surface should be as fine as possible. It is desired therefore to satisfy these contradictory properties at the same time.

A film composed of a polyester containing inert fine particles usually has voids around the fine particles because peeling occurs between the fine particles and the polyester as a result of biaxial stretching. The voids become greater as the fine particles are larger in size, their shape is closer to a spherical shape rather than a plate-like shape, the fine particles are single particles which are more difficult to deform, the area stretch ratio is higher in stretching the unstretched film, and the stretching is carried out at higher temperatures. Since the shape of the protrusions is gentler with incresing size of the voids, the film has a high coefficient of friction and scratches (small injuries) generated on the surface during repeated use facilitate dropping of the particles. Consequently, the durability of the film is decreased, and dust is generated from abrasion.

It has been the previous practice to add calcium carbonate, titanium dioxide, kaolin, etc. as the inert fine particles. Since these fine particles lead to the formation of large voids, they inherently have the aforesaid problem.

Japanese Patent Publication No. 34088/1982 discloses an oriented polyester film containing:
 (I) 0.03 to 1% by weight of an inert substance (A) having an average particle diameter of not more than 0.8 $\mu$m and a volume shape factor of less than 0.08, and
 (II) 0.002 to 0.1% by weight of an inert substance (B) having an average particle diameter larger than that of the inert substance (A) but not more than 1.8 $\mu$m and a volume shape factor of 0.08 to $\pi/6$,
 provided that the volume shape factor f is defined by $f=V/D^3$ wherein D is the maximum diameter ($\mu$m) of the particles of each said inert substance and V is the volume ($\mu$m$^3$) of the particles.

This patent publication states that the volume shape factor f of the inert substance (A) and (B) varies depending upon the method of manufacturing these substances, the place of their occurrence, etc., but is generally in the following ranges according to the types of the inert substances, namely 0.003 to 0.40 for calcium terephthalate and manganese terephthalate, 0.005 to 0.12 for silica, kaolin, potter's clay, diatomaceous earth and aluminosilicates, 0.005 to 0.40 for calcium carbonate, 0.40 to 0.52 for glass beads, 0.08 to 0.25 for barium sulfate, and 0.003 to 0.20 for calcium phosphate. Thus, the above Japanese patent publication does not disclose spherical silica having an f value of about 0.52.

Japanese Laid-Open Patent Publication No. 171623/1984 discloses a biaxially stretched polyester film containing 0.01 to 5% by weight of substantially spherical particles derived from colloidal silica having an average particle diameter (primary particle diameter) of 0.1 to 1 $\mu$m. This patent document totally fails to describe the particle size distribution of colloidal silica.

This Japanese Laid-Open Patent Publication states that the colloidal silica having an average particle diameter of 0.1 to 1 $\mu$m is formed during removing of the alkali from sodium silicate as a raw material. However, it does not at all disclosea specific method of its production.

According to the state of art in 1983 when the application of Japanese Laid-Open Patent Publication No. 171623/1984 was filed, colloidal silica obtained by using sodium silicate as a raw material and removing the alkali from it contained a considerable amount of secondary agglomerates of primary spherical particles, as described, for example, in Journal of Colloid and Interface Science, Vol. 26, pg 62-69, (1968) and "Powder and Powder Metallurgy", Vol. 23, No. 4, pg 19-24, (1976). It is believed therefore that the colloidal silica used in the method described in Japanese Laid-Open Patent Publication No. 171623/1984 contained a considerable amount of secondary agglomerates of primary spherical particles and was incoporated as such in polyesters.

It is an object of this invention to provide a biaxially oriented polyester film having excellent slipperiness and abrasion resistance.

Another object of this invention is to provide a biaxially oriented polyester film having many protrusions of a relatively uniform size on its surface.

Still another object of this invention is to provide a biaxially oriented polyester film in which slipperiness equivalent to that of conventional biaxially oriented polyester films can be achieved by a smaller content of a slip agent than in the conventional films.

A further object of this invention is to provide a magnetic tape having slipperiness and abrasion resistance as well as excellent magnetic recording characteristics.

Other objects of this invention along with its advantages will become apparent from the following description.

According to this invention, these objects and advantages of the invention are achieved by a biaxially oriented polyester film formed from an intimate mixture comprising (1) an aromatic polyester, and
(2) 0.01 to 4% by weight, based on the aromatic polyester, of spherical fine particles of silica having
  (a) an average particle diameter of 0.05 to 4 μm,
  (b) a particle diameter ratio, defined by the ratio of maximum diameter to minimum diameter, of from 1.0 to 1.2, and
  (c) a relative standard deviation ($\sigma$) of particle size, defined by the following equation $$\sigma = \frac{\sqrt{\sum_{i=1}^{n} (D_i - \overline{D})^2 / n}}{\overline{D}}$$

wherein $D_i$ is the diameter (μm) of the equivalent circular area of each of the particles, $\overline{D}$ is an average value (μm) of the diameter of the equivalent circular area defined by the following equation $$\overline{D} = \sum_{i=1}^{n} D_i / n$$

and n is the number of the particles, with the proviso that the diameter of the equivalent circular area denotes the diameter of each particle calculated when it is assumed that each particle is of a true spherical shape, of up to 0.5.

The aromatic polyester (1) in the present invention is a polyester derived from an aromatic dicarboxylic acid as a main acid component and an aliphatic glycol as a main glycol component.

Examples of the aromatic dicarboxylic acid include terephthalic acid, naphthalenedicarboxylic acid, isophthalic acid, diphenylethanedicarboxylic acid, diphenyldicarboxylic acid, diphenylether dicarboxylic acid, diphenylsulfonedicarboxylic acid, diphenylketonedicarboxylic acid and anthracenedicarboxylic acid. Examples of the aliphatic glycol include alkylene glycols having 2 to 10 carbon atoms such as ethylene glycol, trimethylene glycol, tetramethylene glycol, pentamethylene glycol, hexamethylene glycol and decamethylene glycol, and alicyclic diols such as cyclohexane dimethanol.

Preferably, the aromatic polyester used in the invention comprises an alkylene terephthalate and/or an alkylene naphthalate as a main component.

Polyethylene terephthalate, polyethylene 2,6-naphthalate, and copolymers composed of a dicarboxylic acid component at least 80 mole % of which consists of terephthalic acid and/or 2,6-naphthalenedicarboxylic acid and a glycol component at least 80 mole % of which consists of ethylene glycol are especially preferred among the above aromatic polyesters. In these preferred polyesters, not more than 20 mole % of the acid component may consist of any of the above aromatic dicarboxylic acids other than terephthalic acid and/or 2,6-naphthalenedicarboxylic acid, or an aliphatic dicarboxylic acid such as adipic acid and sebacic acid, or an alicyclic dicarboxylic acid such as cyclohexane-1,4-dicarboxylic acid. Moreover, not more than 20 mole % of the glycol component may consist of any of the above-mentioned glycols other than ethylene glycol, or an aromatic diol such as hydroquinone, resorcinol or 2,2-bis(4-hydroxyphenyl)propane, or an aliphatic diol containing an aromatic ring such as 1,4-dihydroxymethylbenzene, or a polyalkylene glycol (polyoxyalkylene glycol) such as polyethylene glycol, polypropylene glycol or polytetramethylene glycol.

The aromatic polyester used in this invention may also have a component derived from a hydroxycarboxylic acid, for example an aromatic hydroxycarboxylic acid such as hydroxybenzoic acid or an aliphatic hydroxycarboxylic acid such as omega-hydroxycaproic acid copolymerized or bonded in an amount of not more than 20 mole % based on the total amount of the dicarboxylic acid component and the hydroxycarboxylic acid component.

The aromatic polyester used in this invention may also contain a trifunctional or higher polycarboxylic acid or polyhydroxy compound such as trimellitic acid or pentaerythritol copolymerized in an amount which maintains the polyester substantially linear, for example not more than 2 mole % based on the entire acid components.

The above polyesters are known per se, and can be produced by methods known per se.

The aromatic polyester used in this invention is substantially linear and has film-formability, particularly by melt-shaping. Preferably, the aromatic polyester has an inherent viscosity, determined at 35° C. for its orthochlorophenol solution, of about 0.4 to about 0.9.

The spherical fine particles of silica (2) used in this invention are characterized by having (a) a small particle diameter, (b) a shape close to a true sphere and (c) a sharp particle size distribution.

Specifically, the spherical fine particles of silica used in this invention have an average particle diameter of 0.05 to 4 μm. The average particle diameter is preferably 0.1 to 2 μm, more preferably 0.1 to 1 μm.

The spherical silica particles have a particle size ratio, defined by the ratio of maximum diameter to minimum diameter, of from 1.0 to 1.2, preferably from 1.0 to 1.15, more preferably from 1.0 to 1.12.

The spherical silica particles used in the invention further having a relative standard deviation ($\sigma$) of particle size, defined by the following equation $$\sigma = \frac{\sqrt{\sum_{i=1}^{n} (D_i - \overline{D})^2 / n}}{\overline{D}}$$

wherein $D_i$ is the diameter (μm) of the equivalent circular area of each of the particles, $\overline{D}$ is an average value (μm) of the diameter of the equivalent circular area defined by the following equation $$\overline{D} = \sum_{i=1}^{n} D_i/n$$

and n is the number of the particles, with the proviso that the diameter of the equivalent circular area denotes the diameter of each particle when it is assumed that each particle is of a true spherical shape, of up to 0.5, preferably up to 0.3, more preferably up to 0.12.

The spherical fine particles of silica used in this invention are each in the shape of a sphere very close to a true sphere, and are markedly different from silica particles previously known as a slip agent, which are ultrafine block-like particles having a particle diameter of about 10 m$\mu$ or agglomerated paticles having a particle diameter of about 0.5 $\mu$m resulting from agglomeration of the block-like particles.

Since the spherical fine particles used in this invention have a relative standard deviation ($\sigma$) of up to 0.5, a spherical shape close to a true sphere and a very sharp particle size distribution, they give protrusions having a very uniform height. Since these protrusions give only relatively small voids around the sherical fine particles, they have a very sharp shape and give a film having much better slipperiness than protrusions having a gentle shape if they are equal in number.

So long as the spherical silica particles meet the aforesaid requirements, there is no limitation on the method of their production and their other properties.

For example, the spherical silica particles may be produced by hydrolyzing ethyl ortho-silicate [Si(OC$_2$H$_5$)$_4$] to prepare monodisperse spheres, and subjecting the monodisperse spheres of hydrous silica [Si(OH)$_4$], to a dehydration treatment to grow the silica bond ($\equiv$Si—O—Si$\equiv$) three-dimensionally (see, Journal of the Japanese Chemical Society, '81, No. 9, p. 1503). This reaction is shown as follows:

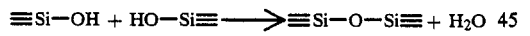

In the aromatic polyester of this invention, the spherical fine particles of silica are included in an amount of 0.01 to 4% by weight, preferably 0.05 to 2% by weight, more preferably 0.1 to 1% by weight, based on the aromatic polyester. If the content of the spherical silica particles is less than 0.01% by weight, their effect of improving the slipperiness and abrasion resistance of the film is insufficient. If, on the other hand, it exceeds 4% by weight, the surface flatness of the film is reduced undesirably.

The aromatic polyester film of this invention can be produced by melt-shaping an intimate mixture comprising the aromatic polyester and the spherical fine particles of silica into a film, and stretching the resulting unstretched film biaxially.

The intimate mixture of the aromatic polyester and the spherical fine particles of silica may be produced usually by adding the spherical silica particles (preferably as a slurry in a glycol) to the reaction system during the reaction of forming a polyester, for example during ester interchange reaction in the ester interchange method, at any desired time of polycondensation reaction or any desired time during the performance of the direct polymerization method. Preferably, the spherical silica particles are added to the reaction system in the initial stage of the polycondensation, for example before the inherent viscosity of a reaction mixture reaches about 0.3.

The biaxially oriented polyester film of this invention may be produced in accordance with conventional methods of producing biaxially stretched films. For example, it may be produced by melt-shaping an intimate mixture of the spherical silica particles and the aromatic polyester into an amorphous unstretched film, stretching the unstretched film biaxially, and heat-setting the stretched film, and as required, heat-treating it under relaxation.

The stretching may be carried out in two directions either consecutively or simultaneously. In the consecutive stretching, the film may, for example, be stretched first in the machine direction at a stretching temperature (T$_1$) of (Tg$-$10) to (Tg$+$45)°C. (where Tg is the glass transition temperature of the polyester), and then in the transverse direction at a stretching temperature (T$_2$) of from (T$_1$+15) to (T$_1$+40)°C.

The stretch ratio may be at least 2.5 times, particularly at least 3 times, in one direction and selected such that the area ratio becomes at least 8, particularly at least 10. The heat-setting temperature may be selected from the range of 180° to 250° C., particularly 200° to 230° C.

When the stretchings in two directions are carried out simultaneously, the stretching temperature may be selected from the range of 70° to 120° C. The stretch ratio and heat-setting temperature may be the same as those described above.

Thus, the present invention provides a biaxially oriented polyester film characterized by having uniform raised and depressed surface characteristics, excellent slipperiness and abrasion resistance and generating only very small amounts of scratches, white powders, etc.

The biaxially stretched polyester film of this invention is obtained by using the spherical fine particles of silica having the characteristics (a), (b) and (c). Thus, when the surface of the film is observed under an electron microscope, protrusions attributed to the spherical fine particles of silica are seen. When the surface of the film is ion-etched and then observed under an electron microscope, the spherical silica particles are directly seen. Electron microscopic observation also shows that the adjoining spherical silica particles are in direct contact with each other or interrupted by a void space. The film of this invention is also characterized in that only up to 10 protrusions among 100 arbitrarily selected protrusions on the film surface before ion etching have a group of spherical silica fine particles having the aforesaid relation.

Investigations of the present inventors have shown that a biaxially oriented polyester film containing not only the spherical fine particles of silica described above but also inert fine particles different from them can be provided as a film having equivalent properties to the above-described biaxially oriented polyester film.

Thus, the present invention also provides a biaxially oriented polyester film formed from an intimate mixture comprising
(1) an aromatic polyester,
(2) 0.005 to 3% by weight, based on the aromatic polyester, of spherical fine particles of silica having (a) an average particle diameter of 0.05 to 4 μm,
(b) a particle diameter ratio, defined by the ratio of maximum diameter to minimum diameter, of from 1.0 to 1.2, and
(c) a relative standard deviation (σ) of particle size, defined by the following equation $$\sigma = \frac{\sqrt{\sum_{i=1}^{n}(D_i - \overline{D})^2/n}}{\overline{D}}$$

wherein $D_i$ is the diameter (μm) of the equivalent circular area of each of the particles, $\overline{D}$ is an average value (μm) of the diameter of the equivalent circular area defined by the following equation $$\overline{D} = \sum_{i=1}^{n} D_i/n$$

and n is the number of the particles, with the proviso that the diameter of the equivalent circular area denotes the diameter of each particle calculated when it is assumed that each paricle is of a true spherical shape,
of up to 0.5, and
(3) 0.005 to 3% by weight, based on the aromatic polyester, of inert fine particles having an average particle diameter of 0.01 to 3 μm and not exceeding the average particle diameter of the spherical fine particles of silica.

The aromatic polyester (1) and the spherical fine particles of silica (2) may be the same as exemplified hereinabove.

The inert fine particles (3) different from the spherical fine particles of silica may be internally deposited particles or externally added particles.

The internally deposited particles are formed and deposited from the catalyst residue, etc. during polyester production and included in the polymer. They may be formed by known methods of forming internally deposited particles described, for example, in Japanese Laid-Open Patent Publications Nos. 61556/1973, 112860/1976, 115803/1976, 41355/1978 and 90397/1979.

Preferably, the internally deposited particles are formed during the period from the substantial termination of the monomer-forming reaction to the initial stage of the polycondensation reaction. Calcium and lithium compounds, for example, are preferably cited as examples of a catalyst used in the monomer-forming reaction and compounds added in this reaction stage. Examples of components which form these calcium compounds or lithium compounds include aliphatic carboxylic acids such as acetic acid, propionic acid and butyric acid, aromatic carboxylic acids such as benzoic acid, p-methylbenzoic acid and naphthoic acid, alcohols such as methanol, ethanol, propanol and butanol, glycols such as ethylene glycol and propylene glycol, chlorine and hydrogen. More specifically, the lithium compounds may be salts of the aliphatic carboxylic acids, salts of aromatic carboxylic acids, alcoholates, glycolates, chlorides and hydrogenated compounds.

The internally deposited particles are formed usually by adding a phosphorus compound to the system in which the aforesaid compound is present. Examples of the phosphorus compound are phosphoric acid, phosphorous acid, and esters (e.g., alkyl or aryl esters) of these. Other additives such as lithium phosphate may be used for formation, particle size adjustment and stabilization of the internally deposited particles. The composition of the internally deposited particles may be changed according to the desired particle diameter because those containing calcium, lithium and phosphorus have a relatively large particle diameter and those containing lithium and phosphorus have a relatively small particle diameter. Preferred internally deposited particles contain 0.03 to 5% by weight of lithium element, 0.03 to 5% by weight of calcium element and 0.03 to 10% by weight of phosphorus element.

The internally added particles have an average particle diameter of preferably 0.01 to 2.5 μm, more preferably 0.05 to 1.5 μm, especially preferably 0.1 to 1.0 μm.

The externally added particles are added, preferably as a slurry in a glycol, either simultaneously or separately with or from the addition of the spherical fine particles of silica within the aforesaid period for adding the spherical fine particles of silica.

Examples of the externally added particles are inert inorganic fine particles such as calcium carbonate, magnesium carbonate, kaolin, clay, bentonite, titanium dioxide, silica, porous silica, barium sulfate, calcium titanate, barium titanate, barium chromate, glass beads and fluorspar; particles of metal salts of terephthalic acid, and particles of metal salts containing an alkylene terephthalate component.

Examples of the metal salts mentioned above are shown below.

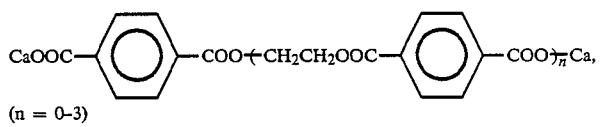

(n = 0-3)

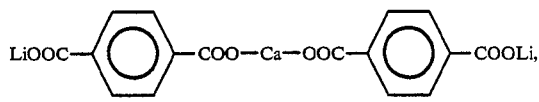

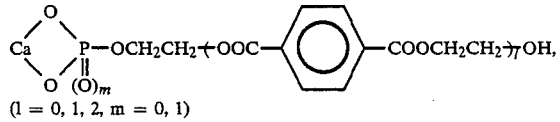

(l = 0, 1, 2, m = 0, 1)

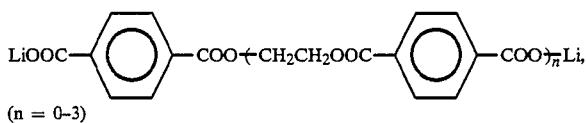

(n = 0-3)

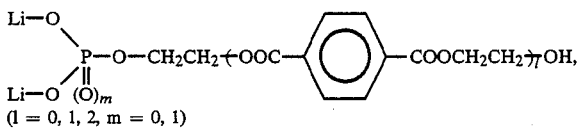

(l = 0, 1, 2, m = 0, 1)

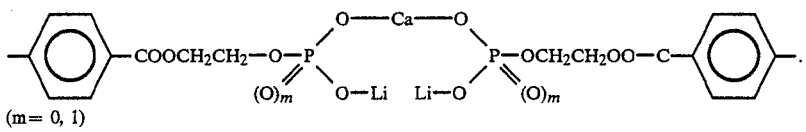

(m = 0, 1)

The metals forming the metal salt particles are preferably alkali metals and alkaline earth metals.

Particles of calcium terephthalate as an example of the above metal salts may be produced by, for example, adding an aqueous solution of terephthalic acid to an aqueous solution of calcium chloride to deposit calcium terephthalate, separating calcium terephthalate, washing and drying it, thereafter dispersing anhydrous calcium terephthalate in a glycol such as ethylene glycol to form a slurry, and subjecting the slurry to a particle size adjusting treatment such as pulverization or classification to form a glycol slurry of calcium terephthalate having a predetermined average particle diameter.

The inert inorganic fine particles as externally added particles have an average particle diameter of preferably 0.05 to 0.6 μm, more preferably 0.1 to 0.5 μm, especially preferably 0.15 to 0.4 μm. The metal salts such as metal terephthalates as externally added particles have an average particle diameter of preferably 0.05 to 4 μm, more preferably 0.1 to 3 μm, especially 0.3 to 2 μm.

The above inert fine particles (3) may be used singly or as a combination of two or more kinds. In any case, the inert fine particles (3) do not have an average particle diameter larger than the spherical fine particles of silica. The biaxially oriented polyester film containing both the spherical fine particles of silica (2) and the inert fine particles (3) has smaller voids than conventional known films, and is particularly characterized in that voids around the spherical silica particles are small. The smallness of the voids around the spherical fine particles of silica is presumably because during stretching, the stress around the spherical fine particles of silica is evenly propagated owing to the good affinity of the spherical silica particles for the polyester and to the extreme closeness of these particles to true spheres, and consequently, the stress is not concentrated locally in the interface between the polyester and the spherical fine silica particles.

The distribution of large protrusions formed on the surface of the polyester film by the addition of fine silica particles having a very sharp particle size distribution is highly uniform and the heights of these protrusions are substantially equal. By further including inert fine particles in this film, the slipperiness of the film can be improved further while maintaining abrasion resistance.

The biaxially oriented polyester film of this invention has uniform raised and depressed surface characteristics, excellent slipperiness and abrasion resistance and generates only very small amounts of scratches, white powder, etc. By utilizing these properties, the film of the invention can be used in various applications. For example, when it is used as a base film for magnetic recording, for example in video, audio and computer applications, excellent electromagnetic converting characteristics, slipperiness and travelling durability can be obtained.

Accordingly, the present invention also provides a magnetic recording medium comprising the biaxially oriented film of the invention and a magnetic layer on one or both surfaces of the film.

When the film of the invention is used in a capacitor, a low coefficient of friction, excellent windability, a low collapsing load and high transparency can be obtained.

Preferably, the biaxially oriented polyester film of the invention is used as a base film of a magnetic recording medium, particularly a magnetic tape. It may also be widely applied to other fields, for example in electrical and packaging applications and as a film for vapor deposition.

The film may also be subjected to a treatment for obtaining easy adhesion, for example coating of an easily adherent layer and a surface treatment such as corona discharge treatment. The film may also contain a third component such as an antistatic agent, an ultraviolet absorber and a coloring agent.

Fine particles of a slip agent may be separated from the biaxially oriented polyester film or the intimate mixture before film formation in the following manner.

A sample (the polyester film or the intimate mixture) is fully washed with water to remove matter adhering to its surfce, further washed with water, and dried. Five hundred grams of the sample is taken, and 4.5 kg of o-chlorophenol is added. With stirring, the mixture is heated to 100° C., and then left to stand at this temperature for 1 hour to dissolve the polyester portion. If the polyester portion is difficult to dissolve because of its high crystallization, it is first melted and rapidly cooled before submitting it to the above dissolving operation.

To remove dust or coarse insoluble materials other than the fine particles of the slip agent, such as a reinforcing agent contained in the polyester, the solution is filtered through a C-1 glass filter. The weight of the dust or the coarse materials is subtracted from the weight of the sample.

The solution after filtration is introduced into an ultracentrifuge equipped with a 40P-type rotor RP30 (made by Hitachi Limited) at a rate of 30 cc per cell.

The rotor is then rotated at 4500 rpm. After confirming that there is no trouble in rotation, the inside of the rotor was evacuated, and the rotating speed is increased to 30000 rpm. At this rotating speed, the particles are separated centrifugally.

The separation is complete in about 40 minutes. If required this is confirmed by determining that the light transmittance at 375 m$\mu$ of the solution after the separation is a fixed value higher than that of the solution before separation. After the separation, the supernatant is removed by decantation to obtain the separated particles.

Since the separated particles might include the polyester as a result of insufficient separation, o-chlorophenol at room temperature is added to the separated particles and the particles are nearly uniformly suspended. The suspension is again treated in the ultracentrifuge. This operation should be repeated until a fusion peak assigned to the polymer can no longer be detected by scanning differential calorimetric analysis on the dried particles. The resulting separated particles are dried in vacuum at 120° C. for 16 hours and then weighed.

The separated particles obtained by the foregoing operation may contain both the spherical silica particles and the other inert fine particles. In this case, the weight of the silica particles and the weight of the other inert fine particles must be separately determined. For example, when the other inert fine particles are internally deposited particles, the separated particles are quantitatively analyzed to determine the contents of Ca and Li and other metals. Then, the particles are heated under reflux for at least 6 hours in 3 molar times their amount of ethylene glycol, and then at more than 200° C., ethylene glycol is distilled off and the remaining polyester is depolymerized. As a result, only the internally deposited particles are dissolved. The remaining particles are separated by centrifugation, dried, and weighed to obtain the weight of the externally added particles. The weight of the internally deposited particles is obtained by subtracting the weight of the externally added particles from the total weight of the separated particles.

The following examples illustrate the present invention in greater detail. The various properties and characteristics in this invention are measured as described below.

(1) Particle diameter of particles (1—1) On spherical silica particles

There are two cases of measuring the particle diameter of particles.

(1) Determination of the average particle diameter, particle diameter ratio, etc. of a powder itself.
(2) Determination of the average particle diameter, particle diameter ratio, etc. of particles in the film.

(1) Determination on the powder

The powder was spread on a sample stand of an electron microscope in such a manner as to avoid superposition of the individual particles as much as possible, and a thin vapor-deposited gold film layer having a thickness of 200 to 300 Å was formed on the surface of the spread powder by means of a gold sputtering device. The coated powder was then observed under a scanning electron microscope at a magnification of 10,000 to 30,000 X. The long diameters ($D_{li}$), short diameters ($D_{si}$) and circular area equivalent diameters ($D_i$) of at least 100 particles were measured by means of Luzex 500 (made by Japan Regulator Co., Ltd.). The long diameter ($D_l$), short diameter ($D_s$) and average particle diameter ($\overline{D}$) of the particles are expressed by number average values represented by the following equations.

$$D_l = \left( \sum_{i=1}^{n} D_{li} \right)/n,$$

$$D_s = \left( \sum_{i=1}^{n} D_{si} \right)/n,$$

$$\overline{D} = \left( \sum_{i=1}^{n} D_i \right)/n.$$

(2) Determination on the particles in the film

A small sample piece of the film was fixed to a sample stand for a scanning electron microscope, and ion etching was performed on the surface of the sample film under the following conditions by means of a sputtering device (JFC-1100 type ion etching device made by Nippon Denshi Co., Ltd.). Specifically, the sample was set in a bell jar, and the degree of vacuum was raised to about $10^{-3}$ torr. Ion etching was carried out at a voltage of 0.25 KV and a current of 12.5 mA for about 10 minutes. Furthermore, in the same device gold sputtering was carried out on the film surface. The coated film was then observed with a scanning electron microscope at a magnification of 10,000 to 30,000 X. The long diameters ($D_{li}$), short diameters ($D_{si}$) and diameters ($D_i$) of the equivalent circular area of at least 100 particles were measured by means of Luzex 500 (made by Japan Regulator Co., Ltd.). Thereafter, the same procedure as in 1) above was taken.

(1-2) On other inert fine particles (1) Average particle diameter of the particles The particles were subjected to a centrifugal particle size analyzer (Model CP-50 made by Shimazu Seisakusho Co., Ltd.). From the cumulative curve of particles of the individual diameters and their amounts calculated on the basis of the resulting centrifugal sedimentation curve, a particle diameter corresponding to a 50 mass percent was read and defined as the average particle diameter of the particles [see "Particle Size Measuring Technique", pages 242-247, 1975, published by Nikkan Kogyo Press).

(2) Particle diameter ratio

A small piece of the film was fixed and molded into a rod shape having a diameter of about 5 mm by using an epoxy resin and an ultrathin slice having a thickness of about 600 Å was prepared by means of a microtome. The inert fine particles existing in the cut section of the sample film slice were observed under a transmission-type electron microscope (Model H-800 made by Hitachi Limited) at an acceleration voltage of 100 KV. The long diameter and short diameter of the particles were determined, and the particle diameter ratio was calculated.

Twenty particles were observed, and the particle diameter of each particle was calculated. The average values of the particle diameter ratios of the twenty particles is defined as the particle diameter ratio.

(3) Relative standard deviation

The particle size distribution was determined from the cumulative curve determined in paragraph 1) above, and the relative standard deviation was calculated in accordance with the following equation.

$$\text{Relative standard deviation } (\sigma) = \sqrt{\sum_{i=1}^{n} (D_i - \overline{D})^2 \phi i} \bigg/ \overline{D}$$

wherein $D_i$ is the particle diameter (μm) determined in paragraph 1) above, $\overline{D}$ is the average particle diameter (μm) determined in paragraph (1) above, n is the number of divisions used in determining the cumulative curve in paragraph (1), and χ is the probability of existence of particles of the individual particle sizes (mass percent).

(2) Film surface roughness (Ra)

This is a centerline average roughness (Ra) defined in JIS-B 0601. In this invention, it is measured by a needle-contacting type surface roughness tester (SURF-CORDER SE-30C mabe by Kosaka Kenkusho Co., Ltd.).

The measuring conditions are as follows:
 (a) Radius of the tip of the contacting needle: 2 μm
 (b) Measuring pressure: 30 mg
 (c) Cutoff: 0.25 mm
 (d) Measuring length: 0.5 mm
 (e) Method of rearranging the data The measuring was repeated five times on the same sample. One largest value was removed. The average value of the remaining four data was calculated. The resulting value was rounded off at the fourth place down the decimal point, and expressed down to the third place from the decimal point.

(3) Void ratio

In accordance with the method described in (1—1), 2) above, the slip agent particles were exposed on the film surface, and the long diameters of at least 50 solid fine particles and the long diameters of voids around them were measured. The void ratio is calculated in accordance with the following equation, and expressed as a number average value.

$$\text{Void ratio} = \frac{\text{Long diameter of a void}}{\text{Long diameter of a solid fine particle}}$$

(4) Coefficient of friction (μk) of the film

A film sample cut to a width of ½ inch was brought into contact with a fixed rod (surface roughness 0.3 μm) at an angle 0 of 152/180ρ radian (152°) and moved at a rate of 200 cm per minute in an environment kept at a temperature of 20° C. and a humidity of 60%. A tension controller was adjusted so that the inlet tension $T_1$ became 35 g. The outlet tension ($T_2$,g) at this time was detected by an outlet tension detector after the film travelled 90 m. The coefficient of travelling friction, μk, was calculated in accordance with the following equation.

$$\mu k = (2.303/\theta) \log (T_2/T_1)$$
$$= 0.868 \log (T_2/35)$$

(5) Abrasion resistance

The abrasion resistance of the travelling surface of the base film was evaluated by using a 5-stage mini-supercalender. The calender was a 5-stage calender composed of nylon rolls and steel rolls. The film was allowed to travel at a speed of 50 m/min. with a linear pressure on the film of 200 kg/cm at a treating temperature of 80° C. When the travelling film was allowed to travel over 2,000 m, the abrasion resistance of the base film was evaluated by soiling adhering to the top roller of the calender on a scale of the following four grades.

⊚: No soiling on the nylon roll
○: Hardly any soiling on the nylon roll
X: Much soiling on the nylon roll
XX: Heavy soiling on the nylon roll

(6) Haze

The haze of the film was measured by an integral sphere type HTR meter (made by Nippon Seimitsu Kogaku Co., Ltd.) in accordance with JIS-K 674.

(7) Coefficient of static friction (μs)

A fixed glass plate was placed under two superimposed films. The lower film contacting the glass plate was taken up by fixed speed rolls at a rate of 15 cm/min. A detector was fixed to one end of the upper film which was located opposite to the direction of taking up the lower film. The pulling force of the film/film was detected. At this time, a thread having a weight of 1 kg and an underside area of 70 cm was used.

(8) Evaluation of scratching

By using the same device for measuring the coefficient of friction as used in paragraph (4), a magnetic tape (½ inch wide) was stretched over the device so that the base film surface of the tape contacted the fixed rod at an angle of 152°. It was then allowed to travel 20 meters at a speed of 5 cm/sec. This travelling was repeated 30 times, and then the size, depth and number of the scratches occurring on the surface of the base film were comprehensively considered, and the scratches were evaluated on a scale of the following five grades.

⊚: No scratch was observed on the base film
○: Hardly any scratch was observed on the base film
Δ: Some scratches were observed on the base film
X: Some thick scratches were observed on the base film
XX: Many thick and deep scratches were observed throughout the base film.

(9) Windability

In the process of manufacturing a biaxially oriented polyester film, the film was wound up in a roll form having a width of 500 mm and a length of 4000 m. The appearance of this roll was examined in detail, and the number of nodular protrusions having a long diameter of at least 2 mm was counted, and rated on the following scale.

0–2: ○
3–5: Δ
6 or more: X

(10) Electromagnetic converting characteristics of a magnetic tape

By using a commercial home VTR, a signal obtained by superimposing a 100% chroma level signal on a 50% white level signal (a 100% white level signal has a peak-to-peak voltage of 0.714 V) was recorded. It was reproduced and measured by a Shibasoku noise meter (Type 925 R). The chroma S/N is defined by the following equation in accordance with the definition of Shibasoku.

$$\text{Chroma } S/N \text{ (dB)} = 20 \log \frac{ES\ (p-p)}{EN\ (rms)}$$

wherein ES (p—p) is the voltage potential (p—p) of the peak-to-peak of the reproduced signal of the white level signal.

$$ES\ (p-p) = 0.714\ V\ (p-p)$$

EN (rms) is the root mean square value of the voltage of the peak of the reproduced signal of the chroma level signal.

EXAMPLE 1

Dimethyl terephthalate and ethylene glycol were polymerized in a customary manner using manganese acetate (ester-interchange catalyst), antimony trioxide (polymerization catalyst), phosphorous acid (stabilizer) and silica particles having the characteristics shown in Table 1 to give polyethylene terephthalate having an inherent viscosity, measured at 35° C. in ortho-chlorophenol, of 0.62.

Pellets of the polyethylene terephthalate were dried at 170° C. for 3 hours, and melted in an extruder at a temperature of 280° to 300° C. The molten polymer was extruded through a slit die (1 mm) onto a rotating cooled drum having a surface finish of about 0.3 S and a surface temperature of 20° C. to form an unstretched film having a thickness of 200 μm.

The unstretched film was pre-heated to 75° C., and stretched to 3.6 times between a low-speed roll and a high-speed roll while it was heated by an IR heater having a surface temperature of 900° C. positioned 15 mm above the film. It was then rapidly cooled, fed to a stenter, and stretched transversely to 3.7 times at 105° C. The resulting biaxially oriented film was heatset for 5 seconds at a temperature of 205° C. to give a heat-set biaxially oriented film having a thickness of 15 μm.

The properties of the stretched film are shown in Table 1.

COMPARATIVE EXAMPLE 1

A heat-set biaxially oriented polyester film was prepared in the same way as in Example 1 except that kaolin having an average particle diameter of 1.2 μm and a particle diameter ratio of 10.0 as a slip agent was used instead of the silica particles.

The resulting film was unsatisfactory because it had a void ratio of 1.7 and in calendering, a white powder adhered to it.

The properties of the film are shown in Table 1.

COMPARATIVE EXAMPLE 1

Polyethylene terephthalate pellets were obtained in the same way as in Example 1 except that calcium carbonate having an average particle diameter of 0.8 μm and a particle diameter ratio of 1.5 was used instead of silica particles.

A biaxially oriented film having a thickness of 15 μm was prepared as in Example 1 using the pellets. The resulting film had a void ratio of 2.5 . Although it had good travelling property, a white powder formed in the calendering step.

The properties of the film are shown in Table 1.

COMPARATIVE EXAMPLE 3

Polyethylene terephthalate pellets were obtained as in Example 1 except that titanium oxide having an average particle diameter of 0.4 μm and a particle diameter ratio of 2.0 was used instead of silica particles.

A biaxially oriented film having a thickness of 15 μm was prepared from the pellets in the same way as in Example 1. The film had a void ratio of 2.0. Although the surface of the film could be designed in a flat shape, it had poor travelling property and a white powder formed in the calendering step or in the travelling system. Since it could not be directly utilized as a tape, an easily slippable layer had to be formed on the surface of the film.

The properties of the film are shown in Table 1.

EXAMPLES 2-4 AND COMPARATIVE EXAMPLES 4-5

In each run, polyethylene terephthalate pellets were prepared in the same way as in Example 1 except that fine silica particles having the average particle diameter and particle diameter ratio indicated in Table 1 were used.

Thereafter, a heat-set biaxially oriented polyester film having a thickness of 15 μm was prepared in the same way as in Example 1 except that the resulting pellets were used.

The properties of the film are shown in Table 1.

TABLE 1

| Item | Unit | CEx. 1 | CEx. 2 | CEx. 3 | Ex. 1 | Ex. 2 | Ex. 3 | Ex. 4 | CEx. 4 | CEx. 5 | Ex. 5 |
|---|---|---|---|---|---|---|---|---|---|---|---|
| Added particles | | | | | | | | | | | |
| Type of particles | — | kaolin | Calcium carbonate | Titanium dioxide | Spherical silica | Spherical silica | Spherical silica | Spherical silica | Spherical silica | Spherical silica | Spherical silica |
| Average particle diameter | μm | 1.2 | 0.8 | 0.4 | 0.36 | 0.52 | 0.78 | 1.07 | 4.0 | 0.78 | 0.78 |
| Particle diameter ratio | — | 10 | 1.5 | 2.0 | 1.1 | 1.05 | 1.15 | 1.15 | 1.5 | 1.15 | 1.15 |
| Relative standard deviation | $\sigma/\overline{D}$ | 0.55 | 0.53 | 0.54 | 0.2 | 0.09 | 0.3 | 0.35 | 0.4 | 0.3 | 0.3 |
| Amount added | wt % | 0.1 | 0.1 | 0.5 | 0.16 | 0.16 | 0.16 | 0.16 | 0.1 | 4.2 | 0.5 |
| Film properties | | | | | | | | | | | |
| Surface roughness Ra | m | 0.032 | 0.020 | 0.009 | 0.009 | 0.011 | 0.016 | 0.025 | 0.08 | 0.09 | 0.035 |
| Coefficient of friction after 200 passes | — | 0.47 | 0.28 | 0.27 | 0.18 | 0.16 | 0.15 | 0.17 | 0.16 | 0.12 | 0.17 |
| Void ratio | — | 1.7 | 2.0 | 1.8 | 1.1 | 1.1 | 1.2 | 1.5 | 2.5 | 2.0 | 1.2 |
| Haze | % | 3.5 | 4.2 | 10.5 | 2.8 | 4.7 | 8.4 | 10.2 | 15.0 | 30.0 | 15.0 |

TABLE 1-continued

| Item | Unit | CEx. 1 | CEx. 2 | CEx. 3 | Ex. 1 | Ex. 2 | Ex. 3 | Ex. 4 | CEx. 4 | CEx. 5 | Ex. 5 |
| --- | --- | --- | --- | --- | --- | --- | --- | --- | --- | --- | --- |
| Abrasion resistance | — |  | XX | X |  |  |  |  | X | X |  |

Note:
Ex. and CEx. in the above and subsequent Tables mean Example and Comparative Example, respectively.

The results show that the biaxially oriented films obtained in Examples 1 to 4 had excellent slipperiness in spite of their flat surfaces, and had excellent abrasion resistance in the calendering step, indicating excellent quality.

EXAMPLES 6–7

Biaxially oriented polyester films were prepared in the same way as in Examples 3 and 4 except that the stretch ratios were changed to 4.5 times in the machine direction and to 3.6 times in the transverse direction. The properties of the film are shown in Table 2.

TABLE 2

| Item | Unit | Ex. 6 | Ex. 7 |
| --- | --- | --- | --- |
| Added particles |  |  |  |
| Type of particles | — | Spherical silica | Spherical silica |
| Average particle diameter | μm | 0.78 | 1.07 |
| Particle diameter ratio | — | 1.15 | 1.15 |
| Relative standard deviation | $\sigma/\overline{D}$ | 0.3 | 0.35 |
| Amount added | wt % | 0.16 | 0.16 |
| Film properties |  |  |  |
| Surface roughness Ra | μm | 0.019 | 0.028 |
| Coefficient of friction after 200 passes | — | 0.17 | 0.18 |
| Void ratio | — | 1.5 | 1.8 |
| Haze | % | 11.0 | 15.0 |
| Abrasion resistance | — |  |  |

EXAMPLES 8–12 AND COMPARATIVE EXAMPLE 6

In each run, polyethylene terephthalate pellets were prepared in the same way as in Example 1 except that fine silica particles having the average particle diameter and particle diameter ratio indicated in Table 3 were used.

A heat-set biaxially oriented polyester film having a thickness of 30 μm was prepared in the same way as in Example 1 except that the results pellets were used. The properties of the film are shown in Table 3.

The biaxially oriented films obtained in Exampels 8 to 12 showed excellent slipperiness and scratch resistance and very good abrasion resistance in the D/F treating step. Furthermore, they had a low friction between films and good processability. All of them thus showed excellent quality.

When the spherical silica particles had a particle diameter of more than 4 μm as in Comparative Example 6, a white powder formed in the dust fabric treatment, and the film had poor abrasion resistance.

EXAMPLES 13–14

Biaxially oriented polyester films were obtained in the same way as in Examples 8 and 9 except that the stretch ratios were changed to 4.5 times in the machine direction and to 3.6 times in the transverse direction. The properties of the films are shown in Table 3.

TABLE 3

| Item | Unit | Ex. 8 | Ex. 9 | Ex. 10 | Ex. 11 | Ex. 12 | Ex. 13 | Ex. 14 | CEx. 6 |
| --- | --- | --- | --- | --- | --- | --- | --- | --- | --- |
| Added particles |  |  |  |  |  |  |  |  |  |
| Type of particles | — | Spherical silica | Spherical silica | Spherical silica | Spherical silica | Spherical silica | Spherical silica | Spherical silica | Spherical silica |
| Average particle diameter | μm | 0.52 | 0.78 | 1.07 | 0.36 | 0.36 | 0.52 | 0.78 | 4.3 |
| Particle diameter ratio | — | 1.05 | 1.1 | 1.1 | 1.05 | 1.05 | 1.05 | 1.1 | 1.5 |
| Relative standard deviation | $\sigma/\overline{D}$ | 0.15 | 0.2 | 0.2 | 0.2 | 0.2 | 0.15 | 0.2 | 0.2 |
| Amount added | wt % | 1.5 | 1.3 | 1.1 | 2.0 | 1.1 | 1.5 | 1.3 | 0.1 |
| Film properties |  |  |  |  |  |  |  |  |  |
| Surface roughness Ra | μm | 0.030 | 0.040 | 0.037 | 0.032 | 0.020 | 0.031 | 0.042 | 0.08 |
| Coefficient of friction after 200 passes | — | 0.16 | 0.15 | 0.15 | 0.18 | 0.16 | 0.16 | 0.15 | 0.16 |
| Void ratio | — | 1.1 | 1.1 | 1.5 | 1.1 | 1.1 | 1.5 | 1.5 | 2.5 |
| Haze | % | 28.2 | 30.3 | 30.0 | 26.5 | 14.5 | 37.9 | 40.2 | 30.0 |
| Abrasion resistance | — |  |  |  |  |  |  |  | X |
| Scratch | — |  |  |  |  |  |  |  |  |
| Film/film friction | — | 0.30 | 0.29 | 0.29 | 0.30 | 0.32 | 0.30 | 0.29 | 0.32 |

COMPARATIVE EXAMPLE 7

A heat-set biaxially oriented film having a thickness of 30 μm was prepared in the same way as in Example 1 except that kaolin having the characteristics shown in Table 4 was used.

The resulting film was unsatisfactory because it had a void ratio of 1.7, and a white powder adhered to the film in the calendering step.

The properties of the film are shown in Table 4.

COMPARATIVE EXAMPLE 8

Polyethylene terephthalate pellets were obtained in the same way as in Comparative Example 7 except that calcium carbonate having an average particle diameter of 0.8 μm and a particle diameter ratio of 1.5 was used instead of kaolin.

A biaxially oriented film having a thickness of 30 μm was prepared in the same way as in Comparative Example 7 except that the resulting pellets were used. The film had a void ratio of 2.0. Although it had good travelling property, a white powder formed in the dust fabric treatment. The properties of the film are shown in Table 4.

COMPARATIVE EXAMPLE 9

Polyethylene terephthalate pellets were prepared in the same way as in Comparative Example 7 except that titanium oxide having an average particle diameter of 0.4 μm and a particle diameter ratio of 2.0 was used instead of kaolin.

A biaxially oriented film having a thickness of 30 μm was prepared in the same way as in Comparative Example 7 except that the resulting pellets were used. The film had a void ratio of 1.8. The film had a high film-to-film friction and poor processability and travelling property, and a white powder formed in the calendering step or in the travelling system. Since it could not be directly utilized as a tape, an easily slippable layer had to be formed on the back surface of the film.

The properties of the film are shown in Table 4.

TABLE 4

| Item | Unit | CEx. 7 | CEx. 8 | CEx. 9 |
|---|---|---|---|---|
| Added particles | | | | |
| Type of particles | — | Kaolin | Calcium carbonate | Titanium dioxide |
| Average particle diameter | μm | 1.2 | 0.8 | 0.4 |
| Particle diameter ratio | — | 10 | 1.5 | 2.0 |
| Relative standard deviation | $\sigma/\overline{D}$ | 0.60 | 0.5 | 0.5 |
| Amount added | wt % | 0.3 | 0.5 | 1.5 |
| Film properties | | | | |
| Surface roughness Ra | μm | 0.040 | 0.032 | 0.020 |
| Coefficient of friction after 200 passes | — | 0.40 | 0.25 | 0.26 |
| Void ratio | — | 1.7 | 2.0 | 1.8 |
| Haze | % | 15.0 | 40.5 | 32.6 |
| Abrasion resistance | — | | XX | XX |
| Scratch | — | XX | | |
| Film/film friction | — | 0.34 | 0.32 | 0.45 |

EXAMPLE 15

Dimethyl terephthalate and ethylene glycol were polymerized in a customary manner using manganese acetate as an ester-interchange catalyst, antimony trioxide as a polymerization catalyst, phosphorus acid as a stabilizer and spherical silica particles having an average particle diameter of 0.27 μm and a particle diameter ratio of 1.05 as a slip agent to give polyethylene terephthalate having an intrinsic viscosity, measured at 35° C. in o-chlorophenol, of 0.62.

Pellets of the polyethylene terephthalate were dried at 170° C. for 3 hours, and melted in an extruder at a temperature of 280° to 300° C. The molten polymer was extruded through a slit die (1 mm) onto a rotating cooled drum having a surface finish of about 0.3 S and a surface temperature of 20° C. to form an unstretched film having a thickness of 200 μm.

The unstretched film was pre-heated to 75° C., and stretched to 3.6 times between a low-speed roll and a high-speed roll while it was heated by an IR heater having a surface temperature of 900° C. positioned 15 mm above the film. It was then rapidly cooled, fed to a stenter, and stretched transversely to 3.7 times at 105° C. The resulting biaxially oriented film was heat-set for 5 seconds at a temperature of 205° C. to give a heat-set biaxially oriented film having a thickness of 15 μm.

Separately, acicular alpha-FeOOH containing 5% of cobalt was reduced with hydrogen at an elevated temperature to obtain $Fe_2O_3$. It was heated in air to obtain a ferromagnetic iron powder having an average needle length of 0.2 μm.

One hundred parts by weight (to be referred to simply as "parts" hereinafter) was kneaded with the following ingredients for 12 hours.

Polyester-polyurethane—12 parts
Vinyl chloride/vinyl acetate/maleic anhyride copolymer—10 parts
alpha-Alumina—5 parts
Carbon black—1 part
Butyl acetate—70 parts
Methyl ethyl ketone—35 parts
Cyclohexanone—100 parts After dispersion, 1 part of oleic acid and 1 part of palmitic acid as fatty acids and 1 part of amyl stearate as a fatty acid ester were further added. The mixture was kneaded for 15 to 30 minutes, and 7 parts of a 25% ethyl acetate solution of a triisocyanate compound was added. The mixture was dispersed for 1 hour under high-speed shear to prepare a magnetic coating composition.

The magnetic coating solution was coated on the above heat-set biaxially oriented film (thickness 15 μm) to a dry thickness of 3.5 μm. The coated film was subjected to an orientation treatment in a dc magnetic field, dried at 100° C., and thereafter calendered. The film was then slit to a width of ½ inch to obtain a video magnetic tape having a thickness of 18.5 μm.

The resulting film had very good windability, a low coefficient of friction after 50 passes, good scratch resistance and good electromagnetic conversion characteristics.

The properties of the resulting film are shown in Table 5.

EXAMPLE 16

A biaxially oriented film and a magnetic tape were prepared in the same way as in Example 15 except that the average particle diameter of the spherical silica particles was changed as shown in Table 5. The film and the tape had very good quality as shown in Table 5.

COMPARATIVE EXAMPLE 10

A biaxially oriented film and a magnetic tape were prepared in the same way as in Example 15 except that the average particle diameter of the spherical silica particles was changed as shown in Table 5. The results are shown in Table 5. The magnetic tape had poor scratch resistance and windability.

COMPARATIVE EXAMPLES 11–12

A biaxially oriented film and a magnetic tape were prepared in the same way as in Example 15 except that calcium carbonate (Comparative Example 11) or kaolin (Comparative Example 12) was used as the slip agent. The results are shown in Table 5.

The films and magnetic tapes obtained had a high coefficient of friction, very poor scratch resistance, and insufficient windability or electromagnetic conversion properties.

EXAMPLE 17

A biaxially oriented film and a magnetic tape were prepared in the same way as in Example 15 except that in film formation, the stretch ratios were changed to 4.5 times in the machine direction and to 3.6 times in the transverse direction.

The properties of the films and tapes are shown in Table 5.

The properties of the film were good as shown in Table 6.

EXAMPLE 20

A heat-set biaxially oriented polyester film was prepared in the same way as in Example 18 except that the stretch ratios in film formation were changed to 4.5 times (pre-heating temperature 70° C.) in the machine direction and to 3.5 times in the transverse direction (stretching temperature 105° C.).

The properties of the resulting film are shown in Table 6.

TABLE 5

| Item | Unit | Ex. 15 | Ex. 16 | CEx. 10 | CEx. 11 | CEx. 12 | Ex. 17 |
|---|---|---|---|---|---|---|---|
| Added particles | | | | | | | |
| Type of particles | — | Spherical silica | Spherical silica | Spherical silica | Calcium carbonate | Kaolin | Spherical silica |
| Average particle diameter | μm | 0.27 | 0.15 | 0.04 | 0.26 | 0.20 | 0.25 |
| Particle diameter ratio | — | 1.05 | 1.05 | 1.1 | 2.0 | 10 | 1.05 |
| Relative standard deviation | $\sigma/\overline{D}$ | 0.1 | 0.1 | 0.2 | 0.6 | 0.9 | 0.1 |
| Amount added | wt % | 0.15 | 0.22 | 0.5 | 0.21 | 0.24 | 0.17 |
| Film properties | | | | | | | |
| Surface roughness Ra | μm | 0.010 | 0.011 | 0.009 | 0.011 | 0.012 | 0.011 |
| Coefficient of friction after 5 passes | — | 0.24 | 0.27 | 0.48 | 0.37 | 0.49 | 0.25 |
| Scratch | — | | | XX | XX | XX | |
| Windability | — | | | X | Δ | X | |
| Electromagnetic conversion characteristics | dB | Standard | +0.5 | +1.5 | +1.5 | Δ2.0 | +0.2 |

EXAMPLE 18

Dimethyl terephthalate and ethylene glycol were polymerized in a customary manner using manganese acetate as an ester-interchange catalyst, antimony trioxide as a polymerization catalyst, phosphorus acid as a stabilizer and spherical silica particles having an average particle diameter of 0.22 μm and a particle diameter ratio of 1.04 as a slip agent to give polyethylene terephthalate having an intrinsic viscosity, measured at 35° C. in o-chlorophenol, of 0.62.

Pellets of the polyethylene terephthalate were dried at 170° C. for 3 hours, and melted in an extruder at a temperature of 280° to 300° C. The molten polymer was extruded through a slit die (1 mm) onto a rotating cooled drum having a surface finish of about 0.3 S and a surface temperature of 20° C. to form an unstretched film.

The unstretched film was pre-heated to 75° C., and stretched to 3.6 times between a low-speed roll and a high-speed roll while it was heated by an IR heater having a surface temperature of 900° C. positioned 15 mm above the film. It was then rapidly cooled, fed to a stenter, and stretched transversely to 3.7 times at 105° C. The resulting biaxially oriented film was heat-set for 5 seconds at a temperature of 205° C. to give a heat-set biaxially oriented film having a thickness of 15 μm.

The properties of the film are shown in Table 6.

EXAMPLE 19

A heat-set biaxially oriented polyester film was prepared in the same way as in Example 18 except that the average particle diameter and amount added of the spherical silica particles were changed as in Table 6.

TABLE 6

| Item | Ex. 18 | Ex. 19 | Ex. 20 |
|---|---|---|---|
| Added particles | | | |
| Type of particles | Spherical silica | Spherical silica | Spherical silica |
| Average particle diameter (μm) | 0.22 | 0.26 | 0.22 |
| Relative standard deviation | 0.14 | 0.14 | 0.14 |
| Amount added | 0.14 | 0.10 | 0.14 |
| Film properties | | | |
| Surface roughness Ra (μm) | 0.007 | 0.006 | 0.006 |
| Void ratio | 1.04 | 1.06 | 1.11 |
| Particle diameter ratio | 1.03 | 1.04 | 1.05 |
| Coefficient of static friction (μs) | 0.32 | 0.36 | 0.47 |
| Ra × μs$^2$ | 0.0007 | 0.0008 | 0.0013 |
| Electromagnetic converting characteristics (dB)* | +2.8 | +3.2 | +2.3 |
| Dropout (number/min.) | 4 | 3 | 6 |

*Chroma S/N as compared with a standard tape.

EXAMPLES 21-28

In each run, Example 1 was repeated except that the two kinds of particles described in Table 7 were used.

The properties of the heat-set biaxially stretched film having a thickness of 15 μm are shown in Table 7.

It is seen from Table 7 that the films obtained in Examples 21 to 28 had a low coefficient of friction after 200 passes, and good travelling property and abrasion resistance.

COMPARATIVE EXAMPLES 13-18

In each run, Example 1 was repeated except that particles having the characteristics described in Table 8 were used.

Table 8 shows the properties of the resulting heat-set biaxially oriented films having a thickness of 15 μm.

TABLE 7

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| Added particles | | | | | | | | | |
| Type of particles (1st component/2nd component) | — | Spherical silica/ titanium dioxide | Spherical silica/ titanium dioxide | Spherical silica/ kaolin | Spherical silica/ kaolin | Spherical silica/ kaolin | Spherical silica/ calcium carbonate | Spherical silica/ porous silica | Spherical silica/ kaolin |
| Average particle diameter (1st component/2nd component) | μm | 0.4/0.3 | 0.8/0.3 | 0.8/0.35 | 1.1/0.35 | 2.0/0.35 | 0.8/0.4 | 0.8/0.35 | 0.8/0.6 |
| Particle diameter ratio (1st component/2nd component) | — | 1.1/1.5 | 1.15/1.5 | 1.15/8 | 1.15/8 | 1.15/8 | 1.15/1.3 | 1.15/10 | 1.15/10 |
| Relative standard deviation (1st component/2nd component) | $\sigma/\overline{D}$ | 0.2/0.5 | 0.3/0.5 | 0.3/0.6 | 0.3/0.6 | 0.35/0.6 | 0.3/0.5 | 0.3/0.5 | 0.3/0.7 |
| Amount added (1st component/2nd component) | wt % | 0.1/0.1 | 0.1/0.2 | 0.2/0.1 | 0.2/0.1 | 0.1/0.1 | 0.2/0.1 | 0.2/0.1 | 0.1/0.1 |
| Film properties | | | | | | | | | |
| Surface roughness Ra | μm | 0.010 | 0.018 | 0.020 | 0.032 | 0.052 | 0.023 | 0.020 | 0.022 |
| Coefficient of friction after 200 passes | | 0.15 | 0.14 | 0.14 | 0.13 | 0.14 | 0.15 | 0.15 | 0.15 |
| Void ratio (1st component/2nd component) | — | 1.1/1.8 | 1.2/1.8 | 1.2/1.8 | 1.2/1.8 | 1.2/1.8 | 1.2/2.0 | 1.2/1.2 | 1.2/1.7 |
| Haze | % | 4.0 | 9.8 | 8.9 | 7.8 | 7.5 | 7.8 | 6.4 | 6.8 |
| Abrasion resistance | — | | | | | | | | |

TABLE 8

| Item | Unit | CEx. 13 | CEx. 14 | CEx. 15 | CEx. 16 | CEx. 17 | CEx. 18 |
|---|---|---|---|---|---|---|---|
| Added particles | | | | | | | |
| Type of particles | — | Kaolin | Calcium carbonate | Titanium dioxide | Porous silica | Kaolin | Calcium carbonate |
| Average particle diameter | μm | 0.35 | 0.4 | 0.35 | 0.35 | 0.6 | 0.8 |
| Particle diameter ratio | — | 8 | 1.3 | 1.5 | 10 | 10 | 1.3 |
| Relative standard deviation | $\sigma/\overline{D}$ | 0.6 | 0.5 | 0.5 | 0.5 | 0.7 | 0.6 |
| Amount added | wt % | 0.2 | 0.2 | 0.2 | 0.2 | 0.2 | 0.2 |
| Film properties | | | | | | | |
| Surface roughness Ra | μm | 0.012 | 0.013 | 0.012 | 0.015 | 0.025 | 0.020 |
| Coefficient of friction after 200 passes | — | 0.47 | 0.35 | 0.35 | 0.45 | 0.36 | 0.18 |
| Void ratio | — | 1.7 | 2.0 | 1.8 | 1.2 | 1.7 | 2.0 |
| Haze | % | 3.0 | 7.2 | 7.5 | 5.2 | 5.3 | 13.0 |
| Abrasion resistance | — | | | X | | | XX |

COMPARATIVE EXAMPLE 19

A biaxially oriented polyester film was prepared in the same way as in Example 13 except that bentonite shown in Table 9 was used instead of kaolin.

The properties of the resulting film are shown in Table 9.

TABLE 9

| Item | Unit | CEx. 19 |
|---|---|---|
| Added particles | | |
| Type of particle | — | Bentonite |
| Average particle diameter | μm | 0.6 |
| Particle diameter ratio | — | 1.5 |
| Relative standard deviation | $\sigma/\overline{D}$ | 0.8 |
| Amount added | wt % | 0.2 |
| Film properties | | |
| Surface roughness Ra | μm | 0.032 |
| Coefficient of friction after 200 passes | — | 0.18 |
| Void ratio | — | 2.0 |
| Haze | % | 13.5 |
| Abrasion resistance | — | X |

EXAMPLE 29

A biaxially oriented polyester film was prepared in the same way as in Example 13 except that instead of kaolin, spherical silica (a product of Nihon Shokubai Kagaku Kogyo K.K.) shown in Table 10 as a first component and kaolin as a second component were used instead of the kaolin.

The properties of the film are shown in Table 10.

TABLE 10

| Item | Unit | Ex. 29 |
|---|---|---|
| Added particles | | |
| Type of particles (1st component/2nd component) | — | Spherical silica/kaolin |
| Average particle diameter (1st component/2nd component) | μm | 0.6/0.5 |
| Particle diameter ratio (1st component/2nd component) | — | 1.12/9 |
| Relative standard deviation (1st component/2nd component) | $\sigma/\overline{D}$ | 0.09/0.6 |
| Amount added (1st component/2nd component) | wt % | 0.1/0.2 |
| Film properties | | |
| Surface roughness Ra | μm | 0.0012 |
| Coefficient of friction after 200 passes | | 0.13 |
| Void ratio (1st component/2nd component) | — | 1.2/1.8 |
| Haze | % | 7.2 |

TABLE 10-continued

| Item | Unit | Ex. 29 |
|---|---|---|
| Abrasion resistance | — | |

Table 10 shows that the film obtained in Example 29 had a very flat surface in spite of having excellent travelling property, and it had especially superior shaving resistance.

EXAMPLE 30

Manganese acetate as an ester-interchange catalyst, lithium acetate and calcium acetate dissolved in ethylene glycol, and spherical silica (0.1% by weight based on polyester) having an average particle diameter of 0.5 μm uniformly dispersed in ethylene glycol were added to a mixture of dimethyl terephthalate and ethylene glycol, and the mixture was subjected to ester-interchange reaction in a customary manner. At the end of the ester-interchange reaction, trimethyl phosphate and antimony trioxide as a polymerization catalyst were added, and the ester-interchange product was polycondensed in a customary manner to give polyethylene terephthalate having an inherent viscosity, measured in ortho-chlorophenol at 35° C., of 0.62.

The amount of the internally deposited particles in this polyethylene terephthalate was determined by the particle separating method described hereinabove, and found to correspond to the amount of the spherical silica particles externally added. The polyethylene terephthalate was held by slide glasses, dissolved, cooled, and then observed under a microscope. It was found that in the polyethylene terephthalate, many particles having an average particle diameter of about 0.6 μm and spherical particles having a particle diameter of 0.5 μm existed in combination. The former were internally deposited particles which were deposited in the polymer during the polyester formation, and the latter were spherical silica particles externally added.

The polyethylene terephthalate was melt-extruded from a slit at 290° C., and rapidly cooled. The unstretched film was stretched to 3.3 times in the machine direction, and to 3.4 times in the transverse direction, and heat-set at a temperature of 210° C. to prepare a biaxially oriented film having a thickness of 14 μm. The properties of the film are shown in Table 11.

The resulting biaxially oriented film had very good slipperiness as is shown by its coefficient of friction of 0.18 after 300 passes, and the film surface had a roughness Ra of 0.015 μm. The film also had good abrasion resistance. It had a quality suitable for use as a base film for a magnetic tape.

EXAMPLES 31–35 AND COMPARATIVE EXAMPLES 20–23

In each run, polyethylene terephthalate and a biaxially oriented polyethylene terephthalate film were prepared in the same way as in Example 30 except that the amount of the spherical silica particles added was changed to 0.005, 0.08, 0.1, 1.0 and 3.0% by weight as shown in Table 11.

For comparison, Example 30 was repeated except that the amount of the spherical silica was changed to 0 (corresponding to the use of the internally deposited particles alone), or 4.0% by weight, and fine spherical silica particles having a particle diameter of 0.04 μm were used as spherical silica particles.

The properties of the biaxially oriented films obtained are shown in Table 11.

It is seen from Table 11 that sufficient travelling property cannot be obtained with the internally deposited particles alone; when the amount of the spherical silica particles exceeds 3% by weight, the amount of a white powder which drops off during travelling increases undesirably; and that if the average particle diameter of the spherical silica is less than 0.05 μm, sufficient travelling property cannot be obtained.

TABLE 11

| | | Spherical silica particle | | | | Film | Coefficient | | | |
| | Internally deposited particles | Diameter (μ) | Amount (%) | Relative standard deviation | Particle diameter ratio | surface roughness (μm) | of friction after 300 passes (μk) | Abrasion resistance | Scratch | Overall evaluation |
|---|---|---|---|---|---|---|---|---|---|---|
| Ex. 30 | Internally deposited particles containing Li, Ca and P elements 0.8 μm (average size); 0.3% by weight | 0.5 | 0.16 | 0.3 | 1.15 | 0.015 | 0.18 | | | |
| Ex. 31 | Internally deposited particles containing Li, Ca and P elements 0.8 μm (average size); 0.3% by weight | 0.5 | 0.005 | 0.3 | 1.15 | 0.009 | 0.45 | | Δ | |
| Ex. 32 | Internally deposited particles containing Li, Ca and P elements 0.8 μm (average size); 0.3% by weight | 0.5 | 0.08 | 0.3 | 1.15 | 0.01 | 0.26 | | | |
| Ex. 33 | Internally deposited particles containing Li, Ca and P elements 0.8 μm (average size); 0.3% by weight | 0.5 | 0.1 | 0.3 | 1.15 | 0.02 | 0.20 | | | |
| Ex. 34 | Internally deposited particles containing Li, Ca and P elements 0.8 μm (average size); 0.3% by weight | 0.5 | 1.0 | 0.3 | 1.15 | 0.03 | 0.15 | | | |
| Ex. 35 | Internally deposited particles containing Li, Ca and P elements | 0.5 | 3.0 | 0.3 | 1.15 | 0.08 | 0.13 | | Δ | |

TABLE 11-continued

| | Internally deposited particles | Spherical silica particle | | | | Film surface roughness (μm) | Coefficient of friction after 300 passes (μk) | Abrasion resistance | Scratch | Overall evaluation |
| --- | --- | --- | --- | --- | --- | --- | --- | --- | --- | --- |
| | | Diameter (μ) | Amount (%) | Relative standard deviation | Particle diameter ratio | | | | | |
| CEx. 20 | Internally deposited particles containing Li, Ca and P elements 0.8 μm (average size); 0.3% by weight | 0.5 | 0 | 0.3 | 1.15 | 0.0075 | 0.6 | Δ | | |
| CEx. 21 | Internally deposited particles containing Li, Ca and P elements 0.8 μm (average size); 0.3% by weight | 0.5 | 4.0 | 0.3 | 1.15 | 0.10 | 0.12 | X | | X |
| CEx. 22 | Internally deposited particles containing Li, Ca and P elements 0.8 μm (average size); 0.3% by weight | 0.04 | 3.0 | 0.2 | 1.05 | 0.009 | 0.60 | | X | X |
| CEx. 23 | Internally deposited particles containing Li, Ca and P elements 0.8 μm (average size); 0.3% by weight | 4.5 | 0.01 | 0.6 | 1.2 | 0.15 | 0.11 | X | | X |

COMPARATIVE EXAMPLES 24–28

In each run, a biaxially oriented polyester film was prepared in the same way as in Example 30 except that fine particles of each of the inorganic substances indicated in Table 12 were used. The properties of the resulting films are shown in Table 12.

It is seen from Table 12 that the films obtained did not have good quality.

EXAMPLE 36

Polyethylene terephthalate and a biaxially oriented polyester film were prepared in the same way as in Example 30 except that the amount and the properties of the spherical silica particles were changed as shown in Table 13.

The properties of the resulting biaxially oriented film had especially excellent slipperiness and abrasion resistance.

TABLE 12

| | Internally deposited particles | Inorganic fine particles | | | | Film surface roughness (μm) | Coefficient of friction after 300 passes (μk) | Abrasion resistance | Scratch | Overall evaluation |
| --- | --- | --- | --- | --- | --- | --- | --- | --- | --- | --- |
| | | Type | Diameter (μ) | Amount (%) | Relative standard deviation | Particle diameter ratio | | | | |
| CEx. 24 | Internally deposited particles containing Li, Ca and P elements 0.8 μm (average size); 0.3% by weight | Calcium carbonate | 0.8 | 0.2 | 0.8 | 1.4 | 0.03 | 0.20 | X | | Δ |
| CEx. 25 | Internally deposited particles containing Li, Ca and P elements 0.8 μm (average size); 0.3% by weight | Calcium carbonate | 1.2 | 0.1 | 0.9 | 1.5 | 0.035 | 0.18 | X | | Δ |
| CEx. 26 | Internally deposited particles containing Li, Ca and P elements 0.8 μm (average size); 0.3% by weight | Titanium dioxide | 0.3 | 0.5 | 0.5 | 1.1 | 0.01 | 0.17 | X | | X |
| CEx. 27 | Internally deposited particles containing Li, Ca and P elements 0.8 μm (average size); 0.3% by weight | Kaolin | 0.4 | 0.2 | 0.6 | 8 | 0.015 | 0.35 | Δ | X | X |
| CEx. 28 | Internally deposited particles containing Li, Ca and P elements 0.8 μm (average size); 0.3% by weight | Kaolin | 0.9 | 0.1 | 0.7 | 10 | 0.03 | 0.30 | Δ | X | X |

TABLE 13

| Internally deposited particles | Spherical silica particle | | | | Film Surface roughness (μm) | Coefficient of friction after 300 passes (μk) | Abrasion resistance | Scratch | Overall evaluation |
| --- | --- | --- | --- | --- | --- | --- | --- | --- | --- |
| | Diameter (μ) | Amount (%) | Relative standard deviation | Particle diameter ratio | | | | | |
| Internally deposited particles containing Li, Ca and P elements 0.8 μm (average size); 0.3% by weight | 0.5 | 0.1 | 0.08 | 1.15 | 0.015 | 0.14 | | | |

EXAMPLES 37–44

In each run, a heat-set biaxially oriented polyester film having a thickness of 15 μm was prepared in the same way as in Example 1 except that two kinds of particles shown in Table 14 were used as a slip agent.

The properties of the films obtained are shown in Table 14. These films had excellent abrasion resistance, travelling property and scratch resistance.

COMPARATIVE EXAMPLES 29–34

In each run, a heat-set biaxially oriented polyester film having a thickness of 15 μm was prepared in the same way as in Example 1 except that the fine particles shown in Table 15 were used as a slip agent.

The properties of the films are shown in Table 15.

The calcium terephthalate particles indicated in Table 15 were prepared by the following procedure.

A 5% by weight aqueous solution of sodium terephthalate was added to a 10% by weight aqueous solution of calcium chloride to form a white precipitate of calcium terephthalate. The calcium terephthalate precipitate was separated, washed with water and then heated at 200° C. to form an anhydrous salt. The anhydrous calcium terephthalate was pulverized in a ball mill and dispersed in ethylene glycol to form a slurry. Subsequent classification gave a glycol slurry of calcium terephthalate having a predetermined particle diameter.

TABLE 14

| Item | Unit | Ex. 37 | Ex. 38 | Ex. 39 | Ex. 40 | Ex. 41 | Ex. 42 | Ex. 43 | Ex. 44 |
| --- | --- | --- | --- | --- | --- | --- | --- | --- | --- |
| Added particles | | | | | | | | | |
| Type of particles | — | Spherical silica/ calcium tere- phthalate | Spherical silica/ calcium tere- phthalate | Spherical silica/ calcium tere- phthalate | Spherical silica/ calcium tere- phthalate | Spherical silica/ calcium tere- phthalate | Spherical silica/ calcium tere- phthalate | Spherical silica/ calcium tere- phthalate | Spherical silica/ calcium tere- phthalate |
| Average particle diameter | μm | 0.1/0.1 | 0.3/0.3 | 0.8/0.5 | 2.0/2.0 | 0.1/0.1 | 0.3/0.3 | 0.8/0.5 | 2.0/2.0 |
| Particle diameter ratio | — | 1.1/7 | 1.1/8 | 1.15/10 | 1.15/10 | 1.1/7 | 1.1/8 | 1.15/10 | 1.15/10 |
| Relative standard deviation | $\overline{\sigma D}$ | 0.2/0.5 | 0.2/0.5 | 0.3/0.5 | 0.3/0.5 | 0.2/0.5 | 0.2/0.5 | 0.3/0.5 | 0.3/0.5 |
| Amount added | wt % | 0.4/0.1 | 0.4/0.1 | 0.15/0.05 | 0.1/0.05 | 0.1/0.4 | 0.1/0.4 | 0.05/0.15 | 0.05/0.15 |
| Film properties | | | | | | | | | |
| Surface roughness Ra | μm | 0.006 | 0.008 | 0.023 | 0.057 | 0.005 | 0.007 | 0.020 | 0.053 |
| Coefficient of friction after 200 passes | — | 0.20 | 0.18 | 0.15 | 0.15 | 0.21 | 0.20 | 0.18 | 0.15 |
| Void ratio | — | 1.1/1.2 | 1.1/1.3 | 1.2/1.5 | 2.0/1.8 | 1.1/1.2 | 1.1/1.3 | 1.2/1.5 | 2.0/1.8 |
| Abrasion resistance | — | | | | | | | | |
| Scratch resistance | — | | | | | | | | | shown in Table 15 were used as a slip agent.

TABLE 15

| Item | Unit | CEx. 29 | CEx. 30 | CEx. 31 | CEx. 32 | CEx. 33 | CEx. 34 |
| --- | --- | --- | --- | --- | --- | --- | --- |
| Added particles | | | | | | | |
| Type of particles | — | Calcium terephthalate | Calcium terephthalate | Calcium terephthalate | Kaolin | Calcium carbonate | Titanium dioxide |
| Average particle diameter | μm | 0.3 | 1.2 | 2.0 | 1.2 | 0.8 | 0.4 |
| Particle diameter ratio | — | 10 | 10 | 10 | 10 | 0.5 | 2.0 |
| Relative standard deviation | $\overline{\sigma D}$ | 0.5 | 0.5 | 0.5 | 0.55 | 0.53 | 0.54 |
| Amount added | wt % | 0.5 | 0.2 | 0.1 | 0.1 | 0.1 | 0.5 |
| Film properties | | | | | | | |
| Surface roughness Ra | μm | 0.005 | 0.035 | 0.055 | 0.032 | 0.020 | 0.009 |
| Coefficient of friction after 200 passes | — | 0.55 | 0.37 | 0.27 | 0.47 | 0.28 | 0.27 |
| Void ratio | — | 1.3 | 1.7 | 2.0 | 1.7 | 2.0 | 1.8 |
| Abrasion resistance | — | | | X | | XX | X |
| Scratch resistance | — | XX | X | Δ | X | Δ | Δ |

What we claim is:

1. A biaxially oriented polyester film formed from an intimate mixture comprising
   (1) an aromatic polyester, and
   (2) 0.01 to 4% by weight, based on the aromatic polyester, of spherical fine particles of silica having
      (a) an average particle diameter of 0.05 to 4 μm,
      (b) a particle diameter ratio, defined by the ratio of maximum diameter to minimum diameter, of from 1.0 to 1.2, and
      (c) a relative standard deviation ($\sigma$) of particle size, defined by the following equation $$\sigma = \frac{\sqrt{\sum_{i=1}^{n}(D_i - \overline{D})^2/n}}{\overline{D}}$$

wherein $D_i$ is the diameter (μm) of the equivalent circular area of each of the particles, $\overline{D}$ is an average value (μm) of the diameter of the equivalent circular area defined by the following equation $$\overline{D} = \sum_{i=1}^{n} D_i/n$$

and n is the number of the particles, with the proviso that the diameter of the equivalent circular area denotes the diameter of each particle calculated when it is assumed that each particle is of a true spherical shape, of up to 0.5.

2. The film of claim 1 wherein the aromatic polyester is derived from an aromatic dicarboxylic acid as a main acid component and an aliphatic glycol as a main glycol component.

3. The film of claim 1 wherein the spherical fine particles of silica have an average particle diameter of 0.1 to 2 μm.

4. The film of claim 1 wherein the spherical fine particles of silica have a particle diameter ratio of from 1.0 to 1.15.

5. The film of claim 1 wherein the spherical fine particles of silica have a relative standard deviation ($\sigma$) of particle size of up to 0.3.

6. The film of claim 1 wherein the spherical fine particles of silica have a relative standard deviation ($\sigma$) of particle size of up to 0.12.

7. The film of claim 1 wherein the amount of the spherical fine particles of silica is 0.05 to 2% by weight based on the aromatic polyester.

8. The film of claim 1 wherein when the surface of the film is observed under an electron microscope, protrusions attributed to the spherical fine particles of silica are seen; when the surface of the film is ion-etched and then observed under an electron microscope, the spherical silica particles are directly seen, and in this observation, the adjoining spherical silica particles are seen to be in direct contact with each other or interrupted by a void space, and that only up to 10 protrusions among 100 arbitrarily selected protrusions on the film surface before ion etching have a group of spherical fine silica particles having the aforesaid relation.

9. A biaxially oriented polyester film formed from an intimate mixture comprising
   (1) an aromatic polyester,
   (2) 0.005 to 3% by weight, based on the aromatic polyester, of spherical fine particles of silica having
      (a) an average particle diameter of 0.05 to 4 μm,
      (b) a particle diameter ratio, defined by the ratio of maximum diameter to minimum diameter, of from 1.0 to 1.2, and
      (c) a relative standard deviation ($\sigma$) of particle size, defined by the following equation $$\sigma = \frac{\sqrt{\sum_{i=1}^{n}(D_i - \overline{D})^2/n}}{\overline{D}}$$

wherein $D_i$ is the diameter (μm) of the equivalent circular area of each of the particles, $\overline{D}$ is an average value (μm) of the diameter of the equivalent circular area defined by the following equation $$\overline{D} = \sum_{i=1}^{n} D_i/n$$

and n is the number of the particles, with the proviso that the diameter of the equivalent circular area denotes the diameter of each particle calculated when it is assumed that each particle is of a true spherical shape, of up to 0.5, and
   (3) 0.005 to 3% by weight, based on the aromatic polyester, of inert fine particles having an average particle diameter of 0.01 to 3 μm and not exceeding the average particle diameter of the spherical fine particles of silica.

10. The film of claim 9 wherein the inert fine particles are internally deposited particles.

11. The film of claim 9 wherein the inert fine particles are externally added particles.

12. A magnetic recording medium comprising the biaxially oriented film of claim 1 and a magnetic layer on one or both surfaces of the film.

13. A magnetic recording medium comprising the biaxially oriented film of claim 9 and a magnetic layer on one or both surfaces of the film.

* * * * *